Feb. 23, 1960            F. TOTZEK            2,926,077

PROCESS OF THERMALLY CRACKING LIQUID HYDROCARBONS

Filed April 30, 1956            3 Sheets-Sheet 1

INVENTOR
FRIEDRICH TOTZEK
BY Cushman, Darby & Cushman
ATTORNEYS

Feb. 23, 1960  F. TOTZEK  2,926,077
PROCESS OF THERMALLY CRACKING LIQUID HYDROCARBONS
Filed April 30, 1956  3 Sheets-Sheet 3

INVENTOR
FRIEDRICH TOTZEK
BY Cushman, Darby & Cushman
ATTORNEYS

United States Patent Office 2,926,077
Patented Feb. 23, 1960

2,926,077
PROCESS OF THERMALLY CRACKING LIQUID HYDROCARBONS

Friedrich Totzek, Essen, Germany

Application April 30, 1956, Serial No. 581,711

Claims priority, application Germany May 2, 1955

6 Claims. (Cl. 48—213)

It is known to produce gaseous hydrocarbons of comparatively low molecular weight by thermal conversion of liquid or gaseous hydrocarbons of higher molecular weight. As initial material, there is more especially to be considered hydrocarbon oils boiling at relatively high temperature, for example, high-boiling petroleum fractions.

For the thermal conversion, there are frequently employed reaction chambers which are provided with ceramic fillings and which are constructed in the manner of the known regenerative heat-storage devices. After the charge in the chamber has been brought to a sufficiently high temperature, the oil to be gasified is sprayed on to the charge. The heat stored in the latter then causes the cracking of the hydrocarbons. This known process has considerable disadvantages. The yield of valuable gas is comparatively low. Comparatively large amounts of elementary carbon are formed and this is deposited on the charge in the reaction chamber. The reaction chamber must be frequently taken out of service in order to replenish the charging material which has become overheated and thus destroyed by burning of the deposited carbon and to restore the free cross-section which is necessary for the passage of the reaction medium.

It has also been proposed to spray the hydrocarbon oil which is to be gasified into a reaction chamber which is simultaneously charged with a flowing gaseous or vaporous medium serving as heat carrier. Even with this process, however, the yield of valuable gases is still only low, and conversely, a considerable amount of elementary carbon is formed. A further disadvantage is that a large part of the initial material is withdrawn from the reaction. The oil which is not decomposed forms viscous masses of tar or asphalt character with the carbon black and these masses can only be removed with great difficulty from the reaction apparatus and must be considered as a waste product of no practical value.

It has now been found that a substantial improvement of the thermal conversion of liquid hydrocarbons into valuable hydrocarbon gases can be achieved by preheating a gaseous or vaporous heat-carrier to a temperature of not less than 1100° C.; flowing said heated gaseous or vaporous heat-carrier through a mixing-device at a velocity of not less than about 100 m. per second; in said mixing device, mixing homogeneously by introducing in liquid phase the initial hydrocarbons to be cracked directly into and in concurrent flow with the perheated heat-carrier and at such rate that the resulting admixture consists of hydrocarbons entrained in said heat-carrier at a ratio respectively of about 1 to 2.5, to about 1 to 5 by weight; and thereafter flowing the resulting mixture into a reaction-chamber while initially avoiding contact of said reaction-products with surfaces of said reaction-chamber; maintaining the reaction-mixture issuing from said mixing-device in said reaction-chamber at a temperature above about 700° C., and thereafter cooling the so formed reaction products that issue from said reaction-chamber by direct contact with a liquid cooling medium while maintaining the temperature of the cooled reaction-products above about 100° C. Due to the high flow velocity of the heat carrier an intimate mixture is produced, the hydrocarbon oil being distributed in extremely fine form in the heat carrier. The mixture then passes from the mixing duct, which is flared in the form of a Venturi tube, into an enlarged reaction chamber in which the splitting up of the hydrocarbons of high molecular weight takes place with corresponding increase in volume without the media contacting the walls of the reaction chamber and other fixed boundary surfaces before the reaction is completed.

Due to the fact that according to the invention the hydrocarbon oil or the like which is to be reacted is in practice homogeneously mixed with the flowing heat carrier before entering the reaction chamber, with extensive breaking up of the oil, the reaction takes place in a substantially more favourable manner than is the case with the former process. In actual fact, the secondary reactions which lead to the formation of elementary carbon are completely or substantially avoided. The yield of gaseous hydrocarbons of low molecular weight is correspondingly high. The reaction itself takes place inside the reaction chamber practically only in the zone which is near the nozzle-like inlets for the reaction mixture. The corresponding reaction products immediately discharge into cooler zones of the reaction chamber, so that disadvantageous secondary transformations are prevented. Consequently, the process according to the invention is for example particularly suitable for the production of gases with a high ethylene content of approximately 35–45%. In this case, a reaction chamber is used of which the walls are cooled in such a manner, if necessary by cooling tubes embedded therein and traversed by cooling water or steam, that the temperature of the reaction media is lowered immediately after the reaction to a temperature which is perhaps lower than 450–500°, this generally being the case at a small distance of about 30–40 cm. ahead of the inlet opening into the reaction chamber.

Since the formation of elementary carbon is almost completely avoided with the process according to the invention, the fraction of unconverted initial material which per se is unavoidable can be recovered from the reaction mixture in a form which can be utilised, perhaps in the form of an oil, which is either burnt for generating the heat necessary for the process or is mixed with the initial material so as to be subjected once again to the thermal cracking process. Nevertheless, it is of advantage according to the invention for the cooling of the reaction media to be carried out in such a way that water cannot be condensed. This can for example be achieved by the gas coolers being charged with tensioned steam as cooling medium. In such coolers, an anhydrous oily product is formed which can be exploited without any difficulty.

Any desired oils or even oil-water mixtures or emulsions can be processed as the initial material. The initial material is advantageously pre-heated before being sprayed into the mixing duct. If the initial material contains water, it is expedient to terminate the pre-heating at temperatures below 100° in order to prevent the evolution of steam and thus a frothing of the oil in the heaters.

The essential characteristic of the equipment advantageously used for carrying the process according to the invention into effect is a mixing duct which is connected on the input side of the reaction chamber and which is equipped with water cooling or the like, the said duct being flared at the inlet end for the flowing hot heat carrier with formation of a step, the hydrocarbon oil or the like to be treated being sprayed into the chamber immediately behind the said step and the mixing duct being flared towards the reaction chamber. The formation of the mixture takes place in such a mixing duct without solid deposits being able to form on the walls of the duct, despite the very high temperature of the heat carrier. Consequently, even after being in operation for a long time, the mixing duct maintains its original cross-sectional form, which ensures the formation of a thorough mixture of hydrocarbon oil and heat carrier, such as is advantageous for the process.

The process according to the invention can with advantage be carried out in an apparatus operating with regenerative preheating of the heat carrier. If it is preferred to operate the reaction chamber continuously, it is possible in such a case for the said chamber to have associated therewith two heat storage devices which operate alternately, i.e. are alternately connected to the mixing device and the reaction chamber. It is however also possible to provide two alternately operated heat storage devices, each of which is connected to a mixing device and reaction chamber, so that the reaction chambers alternately serve for the conversion of the initial material and are charged with the latter.

Instead of using regenerators for heating the heat carrier, this heating can also be effected by exothermal reaction between a fuel and air, and perhaps also air with a high oxygen content or pure oxygen. Combustible gases, hydrocarbon oils or if necessary also solid fuels which are suitable for generating gases can be used as the said fuel. It is also possible to provide the heat for heating the heat carrier partly by heat-exchange in regenerators or recuperators and partly by adding hot waste gases of the type referred to.

The process according to the invention is particularly advantageous for an apparatus operating regeneratively, because disturbances in the reaction chamber due to formation of sediments or deposits in the paths of the gases are excluded. The regenerators can therefore be constructed for long exchange periods.

Another feature of the invention is concerned with the treatment (cooling, purification of suspended substances) of the useful gas which is generated, especially when petroleum or heavy petroleum distillates are used as starting material. The suspended substances (oil spray, tar droplets, small amounts of carbon) contained in this case in the useful gas which is produced are admixed with one another in such a way that generally they cannot be removed from the useful gas without special operational and constructional measures with the aid of an electrostatic separator. In such a case, it is proposed according to the invention that the useful gas should be withdrawn at a comparatively high temperature (for example 700° C.) from the reaction chamber and, before being introduced into the electrostatic vapour separator, should be so pretreated by direct cooling with water and addition of a diluent oil that a smooth and complete separation of the suspended substances from the useful gas is possible.

The manner in which the invention is carried into effect is shown by way of example in the drawing, wherein.

Figure 1:
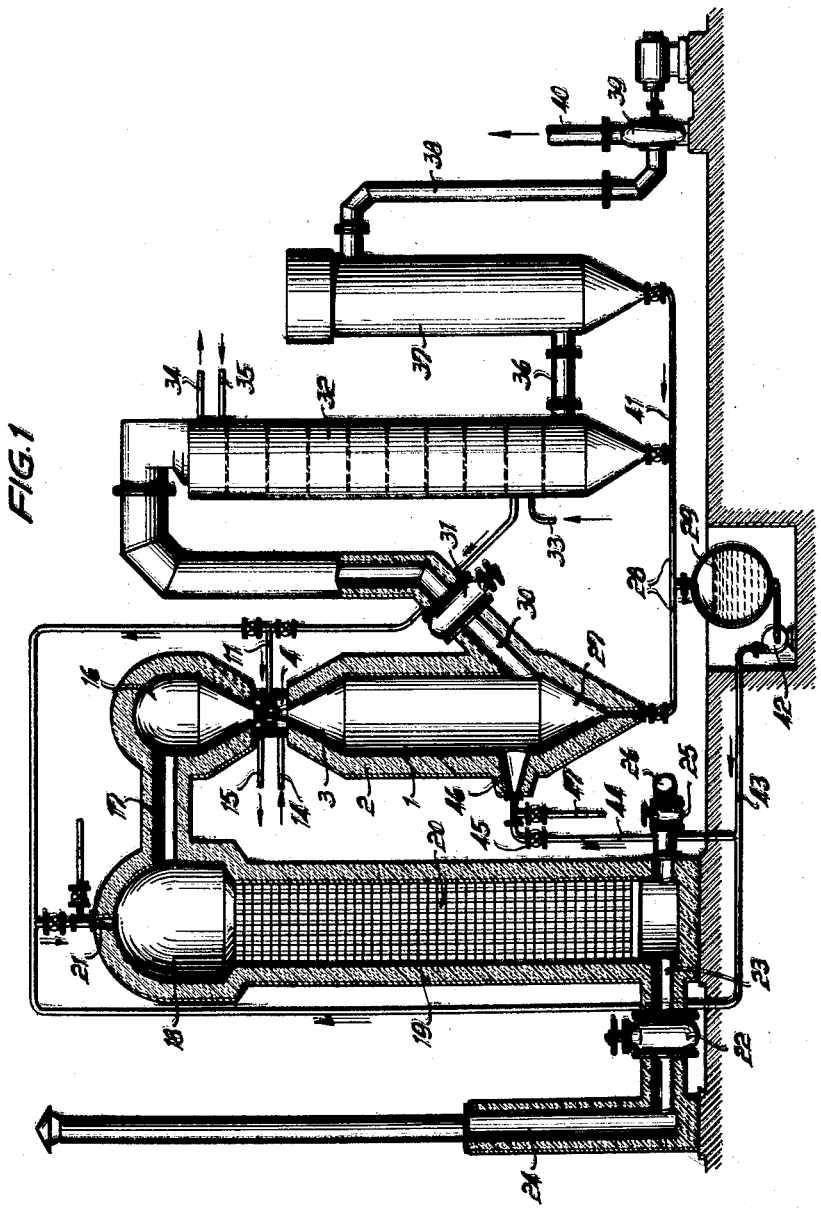
Figure 1 is a view, partly in section and partly in side-elevation, of an apparatus serving for carrying out the process according to the invention.

The apparatus shown in Figure 1 comprises two reaction chambers 1, which are in the form of a vertical cylinder without any internal charge. The walls of the reaction chamber 1 consist of refractory brickwork 2, in which cooling tubes can if necessary be embedded in order to keep the wall temperature at a suitable value. A heat insulation can be provided externally of the brickwork 2.

Figure 2:
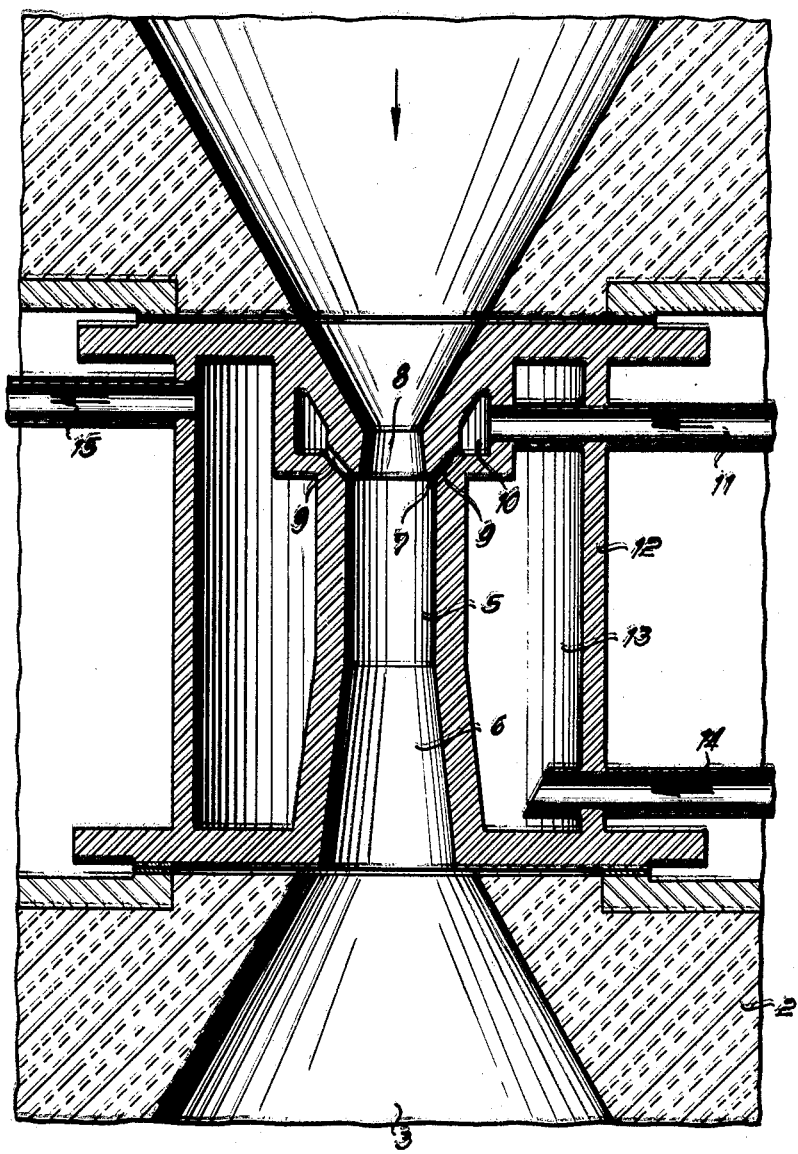
Figure 2 is a sectional view to a larger scale of the mixing duct used in the apparatus according to Figure 1.

As indicated at 3, the reaction chamber 1 tapers conically at the upper end and merges into a water-cooled mixing device 4, the construction of which is shown in detail in Figure 2. As will be seen from this figure, the mixing device has an inner and substantially cylindrical duct 5, which is flared in the manner of a Venturi tube towards the reduced portion 3 of the reaction chamber, as indicated at 6. Provided at the upper end of the cylindrical section 5 of the duct is a step 7 which changes into a constriction 8. Provided at the base of the step 7 are fine apertures or openings 9 which open into the distributing passage 10 for the initial material which is to be treated. The distributing passage 10 is connected to a supply pipe 11 for the initial material.

The complete device is enclosed by a jacket 12. A suitable cooling medium, perhaps water, can be introduced, if necessary at a high pressure, into the space 13 by way of the pipe line 14, the said medium discharging through the pipe 15.

Connected to the upper end of the mixing device 4 is the means for connecting the said mixing device to the associated heat storage device for heating the heat carrier. The connection consists of the cupola chamber 16 and a tube section 17, which opens into the cupola chamber 18 of a tower-like heat storage device 19, which is provided with a conventional heat exchanger charge 20.

In order to heat up the charge 20 of the heat storage device, a fuel such as for example combustible gas or oil is burnt in the cupola chamber 18, the said fuel being supplied through an opening 21 in the cover together with air or oxygen. The hot waste gases flow downwardly through the charge 20 of the recuperator and then pass into the chimney 24 by way of a flue 23 controlled by a shut-off valve 22.

As soon as the charge 20 of the regenerator has been heated up in the required manner, the burner 21 is shut off, the chimney valve or damper 22 is closed and the shut-off valve 25 is opened, this latter valve controlling the supply pipe 26 for cold carrier medium, preferably vapour.

The vapour flowing from below into the charge 20 is heated on the high temperature surface of the charge to approximately 1100° and higher and passes at this temperature to the mixing device 4, where it is mixed with the hydrocarbon oil or the like which is to be processed. From the mixing chamber 4, a mixture of hydrocarbon oil and steam at very high temperature passes into the reaction chamber 1. The increase in volume of the media resulting from the thermal cracking is accommodated by the larger cross-section of the reaction chamber 1. Any fractions of the initial oil which are not transformed are deposited on the conical base 27 of the reaction chamber and can then be withdrawn through the pipe 28 into the storage container 29.

The gaseous fractions of the reaction travel into the gas cooler by way of the pipe line 30 which is controlled by the shut-off valve 31 but which is open in this operative condition; an indirect cooling takes place in the said cooler, the cooling medium, preferably tensioned steam, being supplied through the pipe 33 and discharged through the pipe 34.

In certain circumstances, it can be expedient to supply a small amount of hydrocarbon oil to the top of the coolers through the pipe 35 if hydrocarbons of higher molecular weight have been formed in the reaction, which hydrocarbon do not discharge readily at the cooling temperature which is employed. The base of the cooler 32 is connected to the pipe 28 leading to the oil storage tank 29. The cooled gas passes through the pipe 36 to an electrostatic precipitating device 37 in which the oil vapours or suspended substances still contained in the gas are separated out. The cooled and purified gas finally passes by way of the pipe 38 to the suction device 39 and from the latter by way of the pipe 40, if necessary with interposition of another cooler, to the place of use.

As already mentioned, the complete apparatus can comprise two regenerators and two reaction chambers. These two systems are alternately connected on the one hand to the chimney and on the other hand to the cooling device 32 by actuating the suitable slide valves. At the same time, the corresponding steam valves are actuated and the burners 21 associated with the regenerators and also the oil supply system to the mixing devices 4 of the reaction chambers are changed over.

The hydrocarbon oil or the like to be processed is supplied to the installation by way of the pipe 41. It first of all passes into the oil storage tank 29, from which it is supplied by the pump 42 and the pipes 43 as required either to the burners 21 or to the mixing devices 4.

As will be seen from Figure 1, all the residual oil is therefore utilised in this manner.

In the installation which has been illustrated it is possible to produce a gas with a calorific value of approximately 9,000 to 10,000 kcal./Nm.$^3$. This gas can if necessary be diluted by oil being supplied through the branch pipe 44 and the shut-off valve 45 to the exothermal reaction device 46 in the lower part of the reaction chamber and by oxygen or air being supplied thereto through the pipe 37. The device 46 is operated in such manner that it generates a gas with a high carbon monoxide and hydrogen content, this gas being mixed with the gas produced by thermal cracking.

In certain circumstances, it is advantageous to supply a mixture of steam and production gas or a gas containing other hydrocarbons to the regenerator 19 instead of steam alone. By this means, with the heating of the mixture (to about 1200°), a gas with a high hydrogen content is formed in the regenerator and this gas then serves as heat carrier, while a mixed gas of lower calorific value, preferably about 4300 kcal./Nm.$^3$, is produced in the reaction chamber 1 and this gas can for example be used as town gas.

The mixing device 4 can in certain circumstances advantageously be maintained at an elevated temperature. For this purpose, the cooling medium, for example water, can be supplied at high pressure at a temperature of for example 200–250° to the pressure tight cooling jacket of the mixing device.

The organic fractions, for example tar or tar oils, separated from the reaction products can with advantage be used only for heating the heat storage device, while only fresh hydrocarbon oil is supplied to the mixing device 4.

As already mentioned, when using heavy petroleums or distillates in the electrostatic gas purifier, which usually operates with an input temperature of approximately 150°, a pitch-like substance consisting of oil vapours, tar droplets and carbon is formed which is practically no longer capable of flowing at the temperature concerned and consequently completely clogs the gas purifier after a short time. At normal temperature, this precipitated pitch-like substance is a brittle compound which contains up to 35% of fractions insoluble in xylene and also up to 30% of water. The residue from the gas purifier, at least in this form, constitutes a product which is almost completely valueless, although it still contains a considerable proportion of combustible substance. In this case, the reaction mixture is withdrawn at a temperature of approximately 700° from the cracking chamber and is thereafter cooled by direct contact with water to a temperature of 200–250°. Thereafter, before the reaction mixture (production gas) cooled in this manner is produced into an electrostatic gas purifier, a higher boiling liquid (diluent oil) containing hydrocarbons is sprayed in such a quantity into said reaction mixture that the residual material discharging from the electrostatic gas purifier is capable of being pumped at temperatures between approximately 50 and 150° and can be sprayed. This residual material then serves as heating medium for the heating of the gaseous or vaporous heat carrier, this heating preferably being effected regeneratively.

Due to the fact that the production gas is withdrawn from the reaction chamber at a substantially higher temperature than that described in connection with Figure 1, deposits of viscous cracking residues are prevented from already forming at the bottom of the reaction chamber. At the initial temperature of approximately 700° which has been referred to, these cracking residues are still sufficiently thinly liquid or are present in the form of vapour or droplets. By means of the subsequent direct treatment of the hot production gas with water in a receiver, the heat of vaporisation of the water is on the one hand utilised in advantageous manner for cooling purposes and, on the other hand, by means of the unvaporised water, the result is obtained that all constituents capable of being condensed at the temperature concerned are liquefied without being able to form deposits. The said particles of carbon black and droplets of high boiling hydrocarbon residues which have already been referred to are however present in such a finely divided form that in practice they are not separated from the production gas with the direct water treatment, so that it is merely a mixture of water and hydrocarbons boiling at medium temperature which is formed in the receiver.

The so-called diluent oil is now sprayed into the production gas which is cooled in the manner hereinbefore mentioned, and owing to the said oil being in the form of fine droplets, it is separated in the subsequent electrostatic gas purifier together with the other suspended particles, but now in such a form that the mixture can be satisfactorily pumped and sprayed at the temperature in the range between 50 and 150°. The electrostatic gas purifier consequently remains free from interferring deposits and the purification of the gas takes place with maximum efficiency.

A wide variety of hydrocarbon oils can be considered as diluent oil for the purpose indicated, and especially those which consist entirely of or contain aromatic substances, such as for example tars, more especially coal tars and tars obtained by low-temperature carbonisation, and also tar fractions, for example washing oil and/or anthracene oil or even used benzene washing oil originating from the extraction of benzene from coal distillation gases; finally, petroleum fractions such as bunker-C oil can be used. The amount of diluent oil to be added to the cooled production gas depends upon the initial hydrocarbon which is subjected to thermal decomposition. It has been established that when starting with petroleum or high-boiling petroleum fractions, it is generally possible to manage with an addition of approximately 12 to 15% of diluent oil, based on the initial material, in order to obtain a residue which can be pumped and sprayed satisfactorily and which then serves as fuel for heating the heat storage device.

One particular advantage of the process according to the invention consists in that also the carbon black which in principle is unavoidable, at least to a certain degree, with such a thermal decomposition of high boiling hydrocarbons, can be used for regenerating heat and thus can be employed for improving the industrial efficiency of the process.

The cooling of the production gas leaving the cracking chamber with a temperature of approximately 700–750° by means of direct contact with water is advantageous in that it permits the use of water at a temperature in the region of 80–90° and, if the circulation of the water is carried out in a suitable manner, the formation of dirty water is avoided, the disposal of which is always a costly problem. If the cooling is carried out in the manner according to the invention, the effect can be obtained that in the complete installation there is not formed any dirty water which has to be disposed of, so that it is only necessary for such an amount of replenishment water to be added to the circulation of the cooling medium as is removed altogether from the process by the finally cooled production gas and if necessary by the production gas fraction which is previously branched off to serve other purposes, for example the production of water gas.

Figure 3:
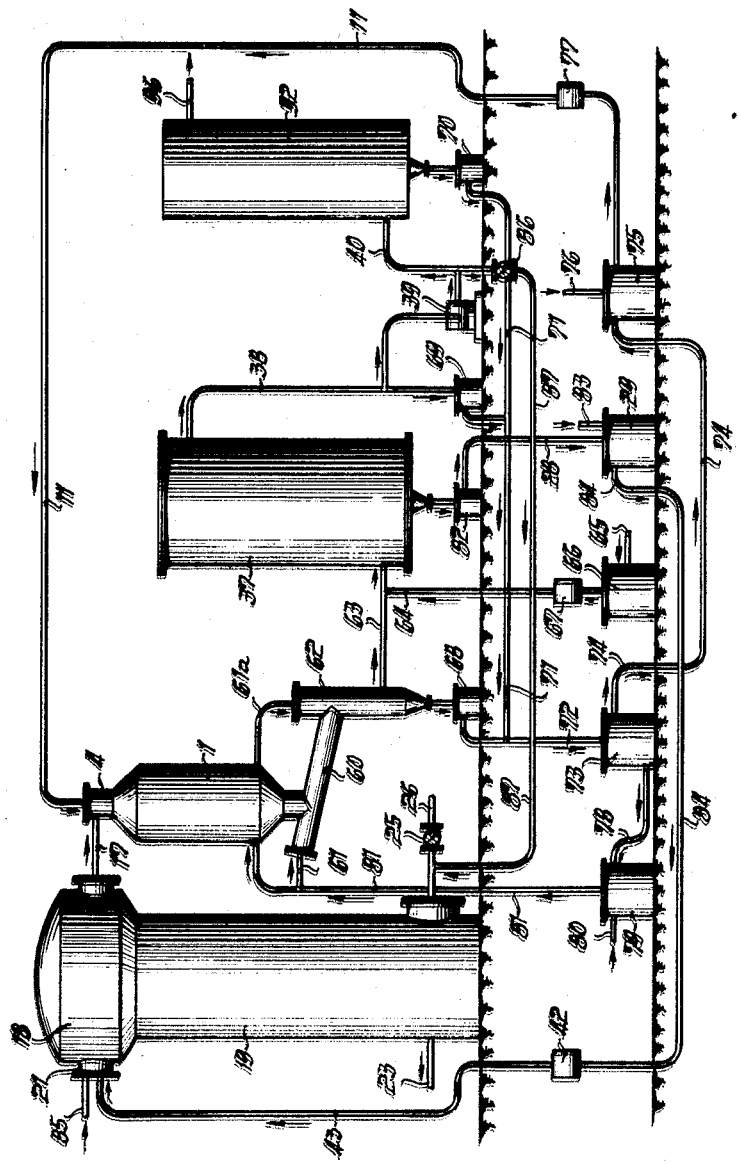
Figure 3 shows another constructional form of the invention, which is mainly used when petroleum or heavy petroleum fractions are employed as initial material.

Figure 3 is a diagrammatic view showing an arrangement by which the last mentioned form of the process according to the invention can be carried into effect, and the parts in this figure which correspond in their function to the parts of the arrangement according to Figures 1 and 2 are given the same reference numerals.

The hydrocarbon oil to be cracked is supplied through the pipe 11 to the mixing nozzle 4, which if necessary is water cooled and into which at the same time the heat carrier preheated to a high temperature in the regenerator 19 is introduced by way of the pipe 17 as propellant steam. The production gas leaves the cracking chamber 1 and passes into the receiver 60, into which water at a temperature of approximately 80° is injected through the pipe 61. The partially cooled gas then enters the collecting tube 62, into which more water is injected by way of a pipe 61a, so that the temperature of the reduction gas on entering the pipe 63 has been lowered to approximately 200–250°. A diluent oil, for example thin road tar, is sprayed into the pipe 63 through the pipe 64. This diluent oil travels from a supply pipe 65 first of all into a storage tank 66 and from thence by means of the pump 67 into the pipe 64. The gas then passes into the electrostatic gas purifier 37 at a temperature of approximately 120–150° and leaves the latter by way of a pipe 38 at a temperature of 80–120°. Thereafter, the gas passes through the gas exhauster 39 and the pipe 40 into the indirect gas cooler 92, in which the gas is cooled to normal temperature. It leaves the cooler by way of a pipe 96. The condensate which collects in the collecting pipe 62 the pipe 38 and the indirect cooler 92 and which consist essentially of a mixture of water and hydrocarbons boiling at low and medium temperatures are first of all collected in the collecting vessels 68, 69 and 70 respectively, and are conducted from these vessels by way of the pipes 71 and 72 into the separator 73, in which decanting takes place. The specifically lighter oil is withdrawn through the pipe 74 and supplied to the collecting vessel 75, to which is simultaneously supplied by way of pipe 76 fresh petroleum which is to be cracked. The pump 77 conveys this oil from the collecting vessel 75 and by way of the pipe 11 through the nozzle 4.

The water settling in the collecting vessel 73 is withdrawn through a pipe 78 and conducted to the water tank 79 into which fresh water flows constantly by way of a pipe 80. From the collecting tank 79, the hot water passes at a temperature of approximately 80° through the pipe 81 to the receiver 60 and the collecting pipe 62.

The residual material separated from the gas and collecting at the base of the electrostatic gas purifier 37 passes first of all into the intermediate container 82 and from thence by way of the pipe 28 into the storage tank 29, to which if necessary more heating oil is supplied by way of a pipe 83. From the storage tank 29, the residual material which is capable of being pumped is extracted by way of a pipe 84 and is supplied through the pump 42 and the pipe 43 to the injection nozzle 21 in the cupola 18 of the regenerator 19. Air is simultaneously supplied to the nozzle 21 through a pipe 85. The combustion of the residual material from the electrostatic gas purified in the cupola of the regenerator naturally only takes place during the periods in which no heat carrier is withdrawn through the pipe 17, that is to say, always when the valve 25 regulating the flow of heat carrier to the regenerator is closed.

The production gas leaving the blower 39 can partly be introduced by way of the valve 86 and the pipe 87 into the regenerator, if this gas is at high temperature after heating. Owing to the direct washing of the production gas with water in the receiver 60, the production gas immediately contains such an amount of steam that it can be split on the hot regenerator charge to form water gas. In this case therefore, the nozzle 4 is not charged with steam but with hot water gas, so that a production gas is produced which, as regards its calorific value, is of the quality of town gas.

*Example I*

A gas with a calorific value of about 10,000 Kcal. for each cubic meter gas (under normal conditions of pressure and temperature) is to be produced by cracking a heavy weight hydrocarbon oil, such as bunker-C oil. The hydrocarbon oil has a specific weight of 0.962 g./cm.$^3$ at a temperature of 20° C. Its viscosity amounts to about 40° Engler at a temperature of 50° C. The heating value of the oil is about 9633 Kcal./kg. The oil boils as follows:

| | |
|---|---|
| 194° C. | Beginning of boiling |
| At 318° C. | 5% vaporised |
| At 332° C. | 10% vaporised |
| At 337° C. | 15% vaporised |
| At 375° C. | 75% vaporised |

The oil is preheated to a temperature of 70° C. and then introduced at a velocity of about 5 m./sec. into the duct-shaped mixing device by lateral openings. Simultaneously steam which has been preheated to a temperature of 1150° C. is introduced axially into the mixing device at a linear velocity of 145 m./sec. thus entraining the liquid oil and atomising it to form droplets of very small diameter. 2.73 kg. preheated steam are used for one kg. oil to be cracked, although the amount of preheated steam can be varied in the range of 2.65 to 2.85 kg. for one kg. oil to be cracked.

The hot reaction products resulting from the cracking reaction are cooled, as soon as their temperature has lowered to about 820° C. due to the endothermic cracking reactions by direct contacting with water having a temperature of about 40° C.; thereby the temperature of the reaction products is lowered to about 220° C. The reaction products are then fed to an electrical precipitator, at the entrance of which some tar oil, i.e. wash oil or anthracene oil is sprayed into the gases in an amount of 0.130 kg. for one kg. starting oil to be cracked. Thereafter the reaction products, now freed from suspended particles like unconverted oil, minor amounts of carbon black, are indirectly cooled to normal temperature. The volume of the gaseous combustible end-product resulting from the last indirect cooling step amounts to 0.51 cubic meter (normal) for one kg. bunker-C oil being cracked. The end-product has a calorific value of about 10,600 Kcal. for each cubic meter gas.

The end-product consists of:

| | Percent |
|---|---|
| $CO_2$ | 8.8 |
| CO | 1.3 |
| $H_2$ | 8.8 |
| $N_2$ | 4.7 |
| $O_2$ | 0.3 |
| $H_2S$ | 1.2 |
| $C_2H_4$ | 35.1 |
| $CH_4$ | 27.5 |
| Other low boiling hydrocarbons | 12.3 |

Example II

The same process as described in Example I is realised except the starting material, which consists of a petroleum distillate the characteristic data of which are the following:

Specific weight _____ 0.724 at 20° C.
Viscosity _____ 1° Engler at 20° C.
Calorific value _____ 10,500 Kcal./kg.
Boiling range:
   103° C. _____ Beginning of boiling
   At 108° C. _____ 1% vaporised
   At 114° C. _____ 40% vaporised
   At 127° C. _____ 97% vaporised The end-product resulting from such starting material is a gas having a calorific value of about 11,400 Kcal./cubic meter. It contains about 47% ethylene.

Example III

A gas with a calorific value of about 4300 Kcal./cubic meter (town-gas) is to be produced by cracking bunker-C oil, the data of which are given in Example I. The heat-carrier consists of 1.075 normal cubic meter steam and 1.8 normal cubic meter recycled end-product gas. This mixture is heated in the regenerative heat accumulator to a temperature of 1180° C. The resulting hot mixture of steam and partially decomposed recycled end-product gas is mixed in the mixing device with 1 kg. bunker-C oil. After the indirect final cooler a gas volume of about 3.22 normal cubic meters is recovered, having a calorific value of about 4325 Kcal./cubic meter. From this gas volume 1.8 cubic meters are recycled to the regenerative heater whilst 1.42 cubic meters are drawn-off into the town-gas main.

What I claim is:

1. A continuous process of thermally cracking liquid hydrocarbons for the production of town gas containing hydrocarbons of lower molecular weight than said liquid hydrocarbons, said process comprising: providing a mixed gaseous heat carrier consisting essentially of steam and recycled end-product, said mixture being composed more than one half by volume of the recycled end-product, preheating said mixed gaseous heat carrier to a temperature of between 1100° C. and 1200° C. by passing said heat carrier in contact with preheated refractory grillwork; flowing said heated gaseous heat carrier through a mixing device at a velocity of above about 100 meters per second; mixing homogeneously by introducing into said mixing device in liquid phase the initial hydrocarbons to be cracked in concurrent flow with the preheated heat carrier and at such rate that the resulting admixture consists of hydrocarbons entrained in said heat carrier wherein the weight ratio of the hydrocarbons to the heat carrier is in the range of about 1 to 2.5 to about 1 to 5; flowing the resulting mixture directly downwardly into an enlarged reaction chamber whereby the splitting of the high molecular weight hydrocarbons occurs practically only in the zone near the mixing device, while initially avoiding contact of said reaction products with the surfaces of said reaction chamber before the reaction is completed; thereafter cooling and substantially reducing the velocity of the reaction products whereby carbon formation is substantially completely avoided; maintaining the reaction mixture issuing from said mixing device into said reaction chamber at a temperature above about 700° C.; cooling the so formed reaction products that issue from said reaction chamber while maintaining the temperature of the cooled reaction products above about 100° C.; flowing said cooled reaction products into an electrical precipitating step for continuously removing entrained solids and oils from the reaction products; passing said purified reaction product from the electrical precipitating step to a final cooling step, and, thereafter recycling a portion of the end-products into admixture with the steam to the initial preheating step thereby producing a mixed heat carrier for the process.

2. A process as claimed in claim 1 and wherein the liquid hydrocarbons to be cracked have a boiling range of between about 103° C. and about 375° C.

3. A process as claimed in claim 1 in which the heat-carrier consists of a mixture of steam and the gaseous, combustible end-product of the process and the liquid hydrocarbons that are to be cracked have a boiling range of between about 194° C. and about 375° C.

4. A process as claimed in claim 1 for producing town-gas having a calorific value of about 500 B.t.u. per cubic foot and wherein the hydrocarbons to be cracked are bunker-C oil and the heat carrier is a mixture of steam and end-product combustible gas of the process in a volume ratio of about 1 to 1.8 respectively at the inlet of the preheating step for the heat-carrier.

5. A continuous process of thermally cracking liquid hydrocarbons for the production of town gas containing hydrocarbons of lower molecular weight than said liquid hydrocarbons, said process comprising: preheating a gaseous heat carrier selected from the group consisting of steam and a mixture of steam and the gaseous combustible end product produced by the process to a temperature of between 1100° C. to 1200° C. by passing said heat carrier in contact with preheated refractory grillwork; flowing said heated gaseous heat carrier through a mixing device at a velocity of above about 100 meters per second; mixing homogeneously by introducing into said mixing device in liquid phase the initial hydrocarbons to be cracked in concurrent flow with the preheated heat carrier and at such rate that the resulting admixture consists of hydrocarbons entrained in said heat carrier wherein the weight ratio of the hydrocarbons to the heat carrier is in the range of about 1 to 2.5 to about 1 to 5; flowing the resulting mixture directly downwardly into an enlarged reaction chamber whereby the splitting up of the high molecular weight hydrocarbons occurs practically only in the zone near the mixing device, while initially avoiding contact of said reaction products with the surfaces of said reaction chamber before the reaction is completed; thereafter cooling and substantially reducing the velocity of the reaction products whereby carbon formation is substantially completely avoided; maintaining the reaction mixture issuing from said mixing device into said reaction chamber at a temperature above about 700° C.; simultaneously generating a gas with high carbon monoxide and hydrogen content by introducing into the reaction chamber below the mixing device a mixture of oil and oxygen-containing air, burning said reactants and adding the thusly formed gas to the reaction products produced by the thermal cracking; and thereafter, cooling the so formed reaction products that issue from said reaction chamber while maintaining the temperature of the cooled reaction products above about 100° C.

6. The process of claim 5 which includes flowing said cooled reaction products into an electrical precipitating step for continuously removing entrained solids and oils from the reaction products; passing said purified reaction product from the electrical precipitating step to a final cooling step, and, thereafter recycling more than half by volume of the reaction products into admixture with steam flowing to the initial preheating step thereby producing a mixed heat carrier for the process.

References Cited in the file of this patent

UNITED STATES PATENTS

| | | |
|---|---|---|
| 1,981,150 | Pyzel | Nov. 20, 1934 |
| 2,111,900 | Nagel | Mar. 22, 1938 |
| 2,140,316 | Furlong | Dec. 13, 1938 |
| 2,266,989 | Radtke | Dec. 23, 1941 |
| 2,605,176 | Pearson | July 29, 1952 |

(Other references on following page)

UNITED STATES PATENTS

| | | |
|---|---|---|
| 2,605,177 | Pearson | July 29, 1952 |
| 2,707,147 | Shapleigh | Apr. 26, 1955 |
| 2,721,888 | Harris | Oct. 25, 1955 |
| 2,723,300 | Lewis | Nov. 8, 1955 |
| 2,751,286 | Totzek | June 19, 1956 |
| 2,790,838 | Schrader | Apr. 30, 1957 |

OTHER REFERENCES

Perry: Chemical Engineers Handbook, 3rd edition, 1950, McGraw-Hill Book Co., page 1041.